United States Patent [19]

Glorio et al.

[11] Patent Number: 5,388,744

[45] Date of Patent: Feb. 14, 1995

[54] TIE DOWN APPARATUS FOR AN AUTOMOBILE LUGGAGE RACK

[75] Inventors: David M. Glorio, Okemos; John S. Cucheran, Lake Orion, both of Mich.

[73] Assignee: Nissan Research and Development, Inc., Farmington Hills, Mich.

[21] Appl. No.: 95,318

[22] Filed: Jul. 22, 1993

[51] Int. Cl.⁶ .............................................. B60R 9/00
[52] U.S. Cl. .................................. 224/324; 224/326; 224/325
[58] Field of Search ................ 224/324, 325, 326, 321

[56] References Cited

U.S. PATENT DOCUMENTS

| | | | |
|---|---|---|---|
| D. 267,087 | 11/1982 | Ingram | D12/157 |
| D. 267,247 | 12/1982 | Kowalski et al. | D12/157 |
| 4,460,116 | 7/1984 | Bott | 224/321 |
| 4,501,385 | 2/1985 | Bott | 224/321 X |
| 4,911,348 | 3/1990 | Rasor et al. | 224/321 |
| 5,143,267 | 9/1992 | Cucheran et al. | 224/321 |

*Primary Examiner*—Henry J. Recla
*Assistant Examiner*—David J. Walczak
*Attorney, Agent, or Firm*—Foley & Lardner

[57] ABSTRACT

A tie down apparatus for an automotive luggage rack includes a holder located inside the outer rails of the luggage rack. The holder consists of a upper section with an aperture; two resilient retaining rails; and two stay rods. The assembly process consists of placing a washer inside the holder and then inserting the combination inside the channel of a luggage rack's outer rails. The tie down stud then can be easily inserted into the apertures of the upper portion and washer. The completed assembly can then be translated to an appropriate location along the outer rail.

3 Claims, 4 Drawing Sheets

TIE DOWN APPARATUS FOR AN AUTOMOBILE LUGGAGE RACK

BACKGROUND OF THE INVENTION

This invention relates to a tie down apparatus for an automobile luggage rack. Nowadays, luggage racks are commonly used to carry suitcases and other commodities. U.S. Pat. No. 5,143,267 shows one example of a luggage rack where an article carrier was disclosed using a spring member on each bracket member by cooperating with notches in a channel member of the side rails for detachably securing and longitudinally adjusting the crossbar upon the side rails. A conventional luggage rack, as shown in FIG. 10, has outer rails 100 mounted on a roof, along the vehicle's longitudinal axis, cross bars 102 which connect the outer rails 100, skid strips 104 mounted on the roof in order to protect from scratches, and tie down studs 106, disposed on the outer rails 100. The tie down studs 106 are used to prevent luggage on the roof from falling off by tying one end of a piece of rope through a loop 108 of a tie down stud then having the rope pass over the luggage lying on top of the skid strips while the other end of the rope is tied through a loop 108 of a tie down stud, located on an opposite outer rail.

In prior U.S. Pat. No. DES. 267,247 and DES. 267,087, a tie down bracket for a luggage rack is disclosed. While these designs have achieved commercial success, some problems have been experienced in providing a more aesthetically pleasing and more simple to use rack.

SUMMARY OF THE INVENTION

The primary object of this invention is to provide an improved tie down apparatus for an automobile luggage rack. Another object of this invention is to prevent the tie down stud from easily falling off the outer rails; for example, due to rotating brushes from car wash machines. Furthermore, this invention has another object to provide an improved luggage rack in which a disconnected tie down stud can be reattached.

To achieve the aforementioned objects, this invention basically includes an outer rail mounted on a vehicle roof; a tie down apparatus disposed on the outer rail; a washer; and a holder.

DETAILED DESCRIPTION OF THE PREFERRED EMBODIMENT

Figure 1:
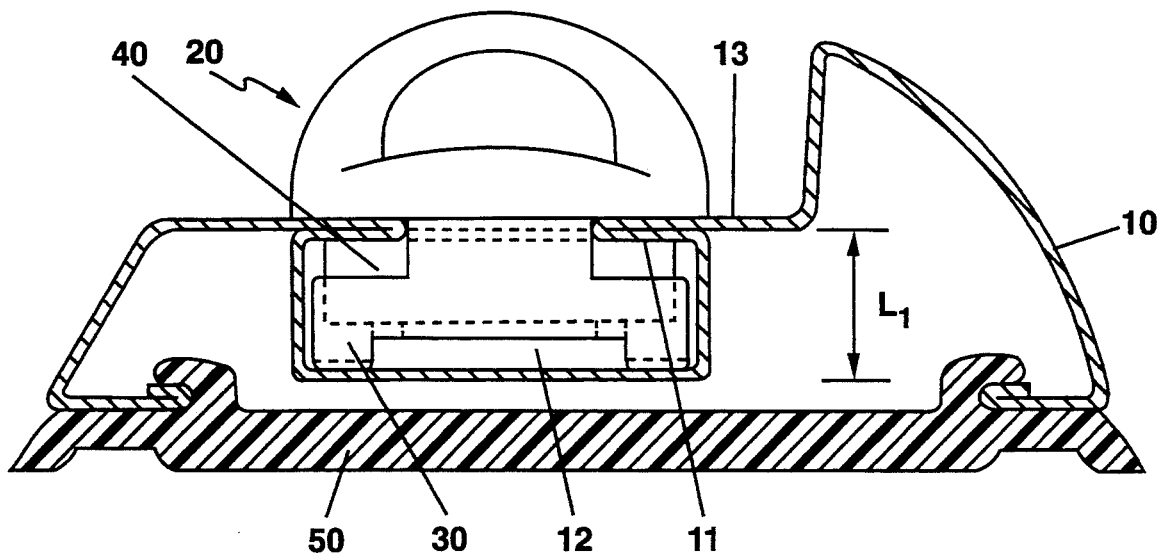
FIG. 1 is a view partially in section showing the outer rails and tie down apparatus.

FIG. 1 is a cross-sectional view transverse to the rail's longitudinal axis, showing an end view of the installed tie down apparatus. The tie down apparatus has an outer rail 10 containing a tie down stud 20 connected with a combination of a holder 30 and a washer 40. A channel 12 is formed inside the outer rail 10. The depth of the channel is "$L_1$." A base plate 50, made of plastic, prevents a roof from being scratched.

Figure 2:
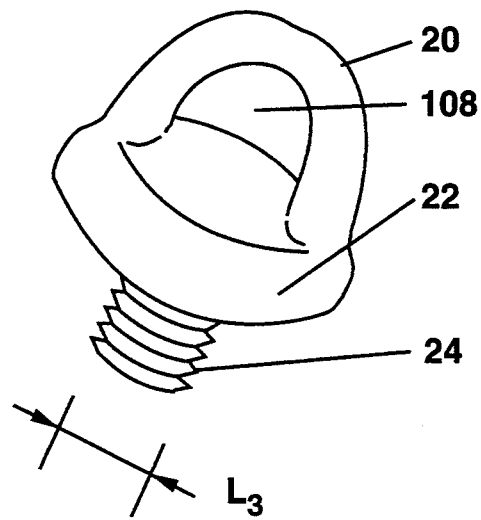
FIG. 2 is a perspective view of the tie down stud.
Figure 3:
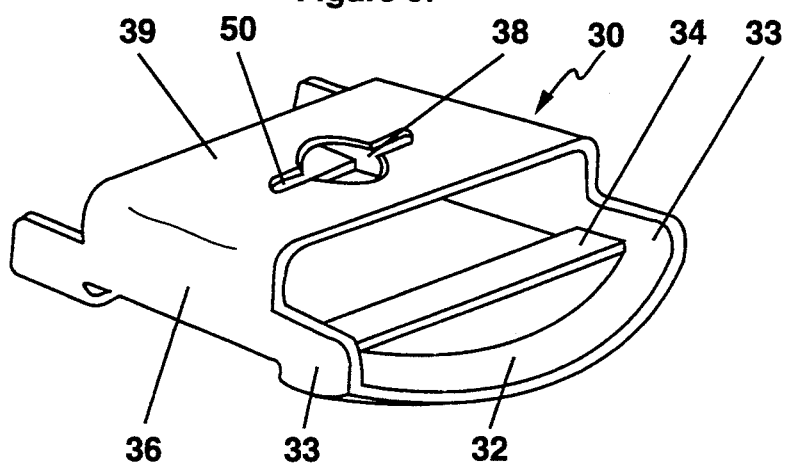
FIG. 3 is a perspective view of the holder.
Figure 4:
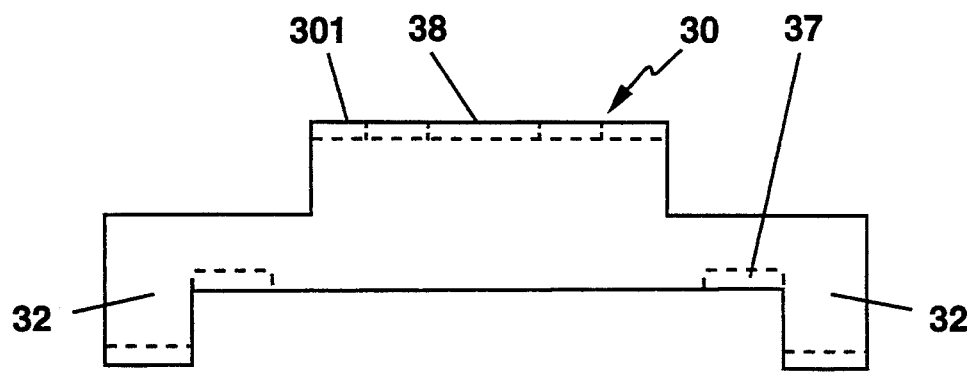
FIG. 4 is a front view of a holder.
Figure 5:
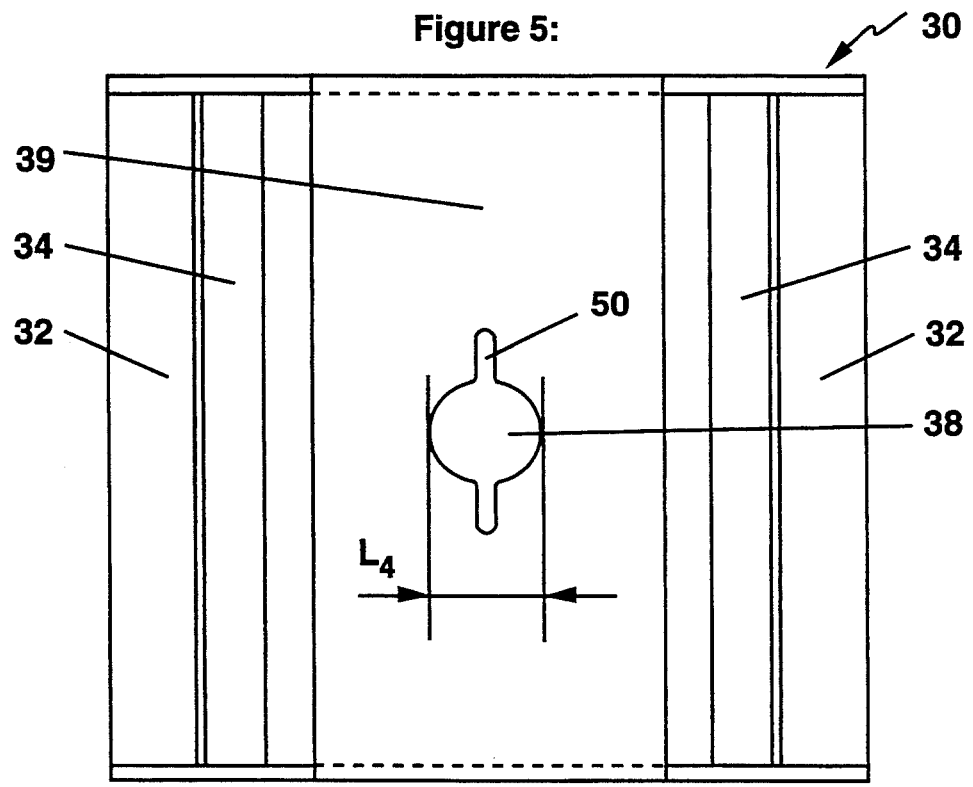
FIG. 5 is a plan view of a holder.
Figure 6:
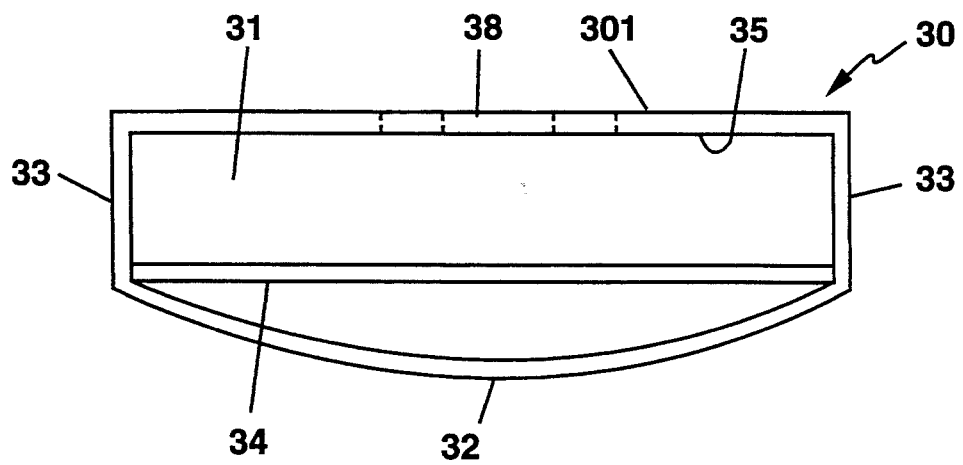
FIG. 6 is a side view of a holder.

The tie down stud 20, shown in FIG. 2, has a knob portion 22, which can be used to connect to one end of a bungee cord, and a shaft portion 24. The diameter of the shaft portion 24 is "$L_3$." The detailed construction of the holder 30 is described based upon FIGS. 3, 4, 5, and 6. Holder 30 is made of nylon, and consists of two resilient retaining rails 32 connected perpendicularly to both side edges 33 of the holder, two stay rods 34 located between the retaining rails 32, and a C-shaped body 36 having an aperture 38 in the center of its upper portion 39. The diameter of aperture 38 is defined as "$L_4$" and is slightly smaller than the diameter "$L_3$" of shaft portion 24.

Figure 7:
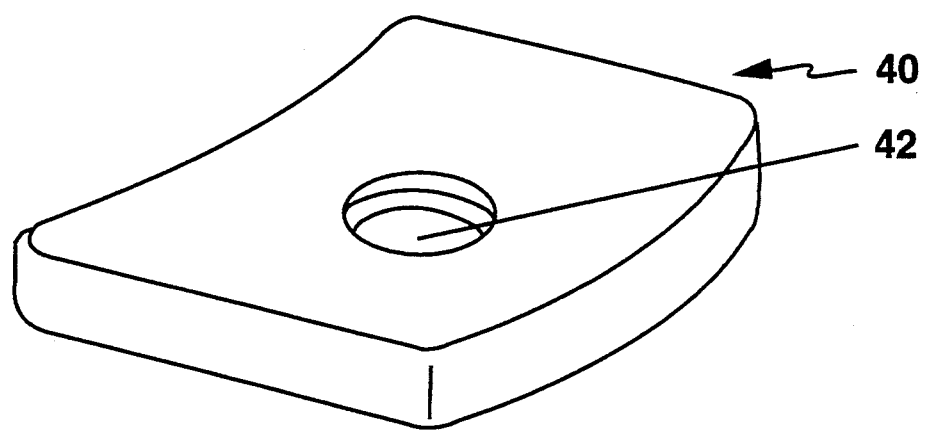
FIG. 7 is a perspective view of a washer.

FIG. 7 shows a slightly curved washer 40 made of metal, having a machined aperture 42, which passes through the washer 40. When the shaft portion 24 of tie down stud 20 is rotated into the aperture 42 a certain retention force is created forcing the washer 40 to move upward and press against the bottom portion 11 of the outer rails 10.

Figure 8:
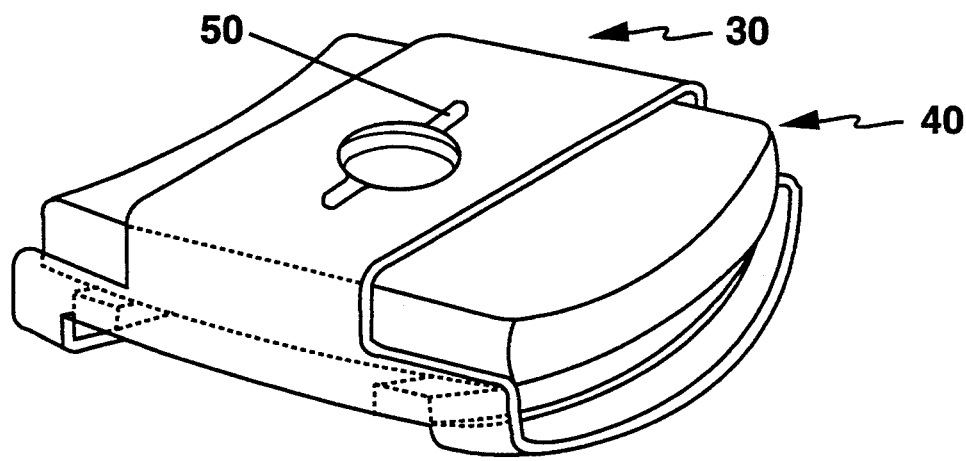
FIG. 8 is a perspective view designating the combination of the holders and washers.
Figure 9:
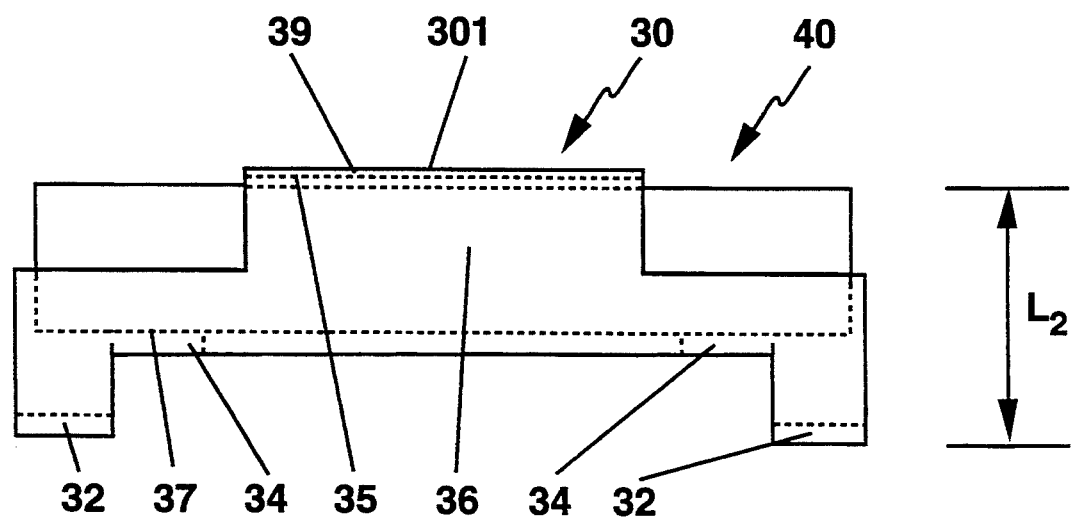
FIG. 9 is a front view of the combination shown in FIG. 8.
Figure 10:
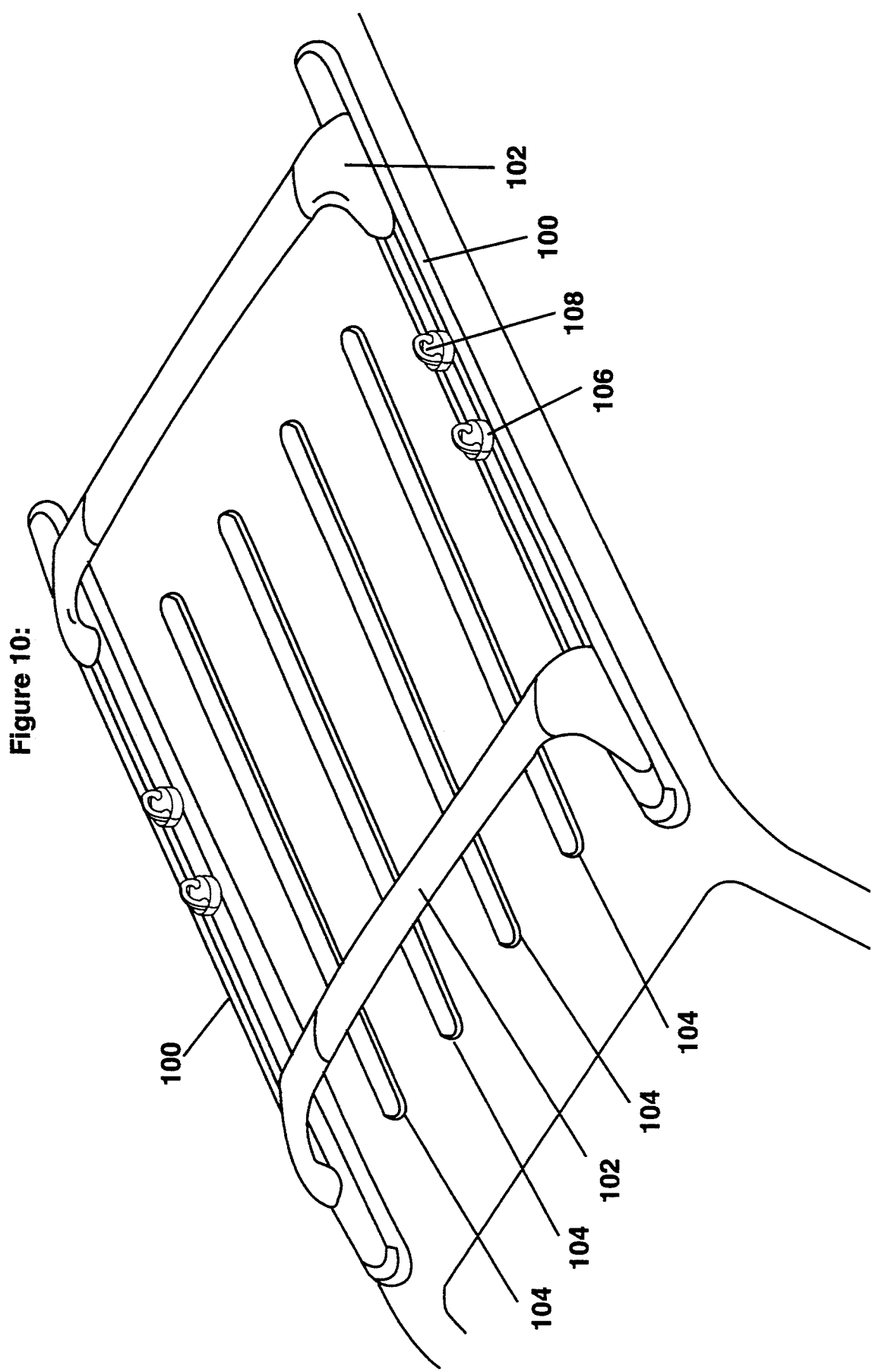
FIG. 10 is a perspective view of prior art showing a conventional luggage rack.

Both FIG. 8 and FIG. 9 indicate the preferred state of the combination of the holder 30 with washer 40. The washer 40 is translated horizontally into the space 31 defined between the bottom surface 35 of upper portion 39 and the top surface 37 of the two stay rods 34. The curvature of the retaining rails 32 is designed so the distance "$L_2$," between the bottom of retaining rails 32 and the top surface of washer 40, is larger than the depth "$L_1$" of channel 12. Due to the difference between "$L_1$" and "$L_2$," when the preferred state is inserted into the channel 12, the curved retaining rails 32 compress along the bottom of channel 12 which creates a resilient force upward which also lifts the body 36 vertically so the upper surface 301 of upper portion 39 is flush with the top 13 of outer rail 10 which can best be seen in FIG. 1.

In this preferred embodiment when the brushes of a car wash machine strike and try to rotate the tie down stud 20, since the diameter "$L_4$" of aperture 38 is smaller than the diameter "$L_3$" of shaft portion 24, then even if the shaft portion 24 becomes freed from aperture 42, then shaft portion 24 of tie down stud 20 is still engaged with aperture 38 and prevents the stud 20 from completely falling out of the outer rail 10.

Furthermore, since the retaining rails 32 are formed with curved cross-sections, it is then easier to translate horizontally the tie down stud 20 and combination of holder 30 and washer 40, to a better location inside channel 12 of outer rail 10.

In the beginning of the assembly process of this preferred embodiment, the washer 40 is transversely translated into the space 31 of holder 30, and then the combination of the holder 30 with washer 40 is forwardly inserted into the channel 12. However, in a conventional assembly process, just a washer may be simply placed on top of a holder with no upper portion and then inserted into a channel. This conventional assembly process can be very cumbersome and tedious in not allowing for easy insertion of the combination into a channel. The assembly process of the preferred embodiment described above has another advantage of improving the workability process by shortening the assembly time with the addition of the upper portion 39.

Finally, in order to complete the assembly process, the shaft portion 24 of the tie down stud 20 is screwed through apertures 38 and 42. As aforementioned, since the upper surface 301 is flush with the top 13 of outer rail 10, it is very easy to find where the apertures 38 and 42 are located, and insert shaft portion 24 into apertures 38 and 42. Therefore, the workability of the process is further enhanced by shortening the assembly time.

The preferred embodiment described above has two separate resilient retaining rails connected to both side edges of the holder. However, this invention is not restricted to such an embodiment and encompasses other embodiments such as the use of a wide piece of resilient retaining rail covering the entire bottom portion of the holder.

What is claimed is:

1. A tie down apparatus for an automobile luggage rack comprising:
   an outer rail having an inside channel;
   a tie down stud having a knob portion and a shaft portion for assisting in preventing luggage on an automobile roof from falling off; and
   a combination, of a holder and a washer, disposed inside said channel for connection with said tie down stud;
   wherein said holder includes an aperture, formed in an upper portion of said holder, which has a smaller diameter than a diameter of the shaft portion of said tie down stud; and
   wherein said holder further comprises a resilient retaining rail for lifting the upper portion of said holder to be flush with a top surface of said outer rail.

2. A tie down apparatus for an automobile luggage rack as set forth in claim 1,
   wherein said resilient retaining rail has a curved surface which makes contact with a bottom surface of said inside channel.

3. A tie down apparatus for an automobile luggage rack comprising:
   an outer rail having an inside channel;
   a tie down stud having a knob portion and a shaft portion for assisting in preventing luggage on an automobile roof from falling off; and
   a combination, of a holder and a washer, disposed inside said channel for connection with said tie down stud;
   wherein said holder includes an aperture, formed in an upper portion of said holder, which has a smaller diameter than a diameter of the shaft portion of said tie down stud; and
   wherein said holder further comprises at least one securing member positioned near a bottom portion of said holder, said securing member and said upper portion forming a space therebetween for containing said washer.

* * * * *